United States Patent [19]

Gohin et al.

[11] Patent Number: 4,604,898
[45] Date of Patent: Aug. 12, 1986

[54] PRESSURE MEASURING DEVICE

[75] Inventors: Christian Gohin, Magny; Henri Leblond, Versailles, both of France

[73] Assignee: Badin Crouzet, Chateaufort, France

[21] Appl. No.: 661,320

[22] Filed: Oct. 16, 1984

[30] Foreign Application Priority Data

Oct. 21, 1983 [FR] France .................... 83 16767

[51] Int. Cl.⁴ .............................................. G01L 9/12
[52] U.S. Cl. .................................. 73/701; 73/702; 73/724; 331/65; 331/138; 324/61 R
[58] Field of Search ................. 73/701, 702, 724, 718; 331/65, 138; 324/61 R

[56] References Cited

U.S. PATENT DOCUMENTS

| | | | |
|---|---|---|---|
| 3,343,417 | 9/1967 | Peek, Jr. .................... | 73/116 |
| 3,545,275 | 12/1970 | Harrison et al. ............ | 73/753 |
| 3,821,659 | 6/1974 | Ludwig ...................... | 331/65 |
| 3,883,796 | 5/1975 | Holt et al. .................. | 331/65 |
| 3,927,369 | 12/1975 | Billeter et al. ............. | 374/117 |
| 4,006,430 | 2/1977 | Meyer-Ebrecht ............ | 331/65 |
| 4,111,058 | 9/1978 | Gross ......................... | 73/714 |
| 4,149,423 | 4/1979 | Frosch ....................... | 73/724 |
| 4,228,393 | 10/1980 | Pile ............................ | 331/65 |

Primary Examiner—Donald O. Woodiel
Attorney, Agent, or Firm—Stevens, Davis, Miller & Mosher

[57] ABSTRACT

A device is provided comprising a circuit using the properties of a resonating cavity sensor whose resonance frequency is modified by the electric capacity variations due to the mechanical deformation of a wall under the effect of the pressure to be measured. It uses a single coaxial cable for connecting the sensor to the user circuit and the sensor, through the coaxial cable, is placed in the leg of an impedance bridge providing the value of the standing wave rate characteristic of the difference between the tuning frequency of the cavity and the frequency of an oscillator controlled by this rate.

6 Claims, 5 Drawing Figures

PRESSURE MEASURING DEVICE

BACKGROUND OF THE INVENTION

1. Field of the Invention

The present invention relates to pressure measuring devices using the properties of a resonating cavity sensor whose resonance frequency is modified by mechanical deformation of a wall under the effect of the pressure to be measured.

2. Description of the Prior Art

This kind of sensor whose fundamental principle is well known has proved advantageous for the instantaneous measurement of static and dynamic pressures more especially for applications related to the equipment of airborne vehicles. In fact, considering on the one hand, the severity of the stresses, not only dimensional but also environmental to which modern airborne vehicles are subjected, and on the other hand considering the organic redundance which is generally imposed on their equipment, it has become indispensable to have pressure measuring means which are not only small, light and robust but also capable of supplying practically instantaneous information to the navigating and piloting systems of the aircraft while remaining accurate and reliable in an extensive range of variation of the factors of influence.

Now, traditional devices with which airborne vehicles are equipped for measuring static and total pressures are essentially formed by a tubular probe disposed in the airstream at a distance from the outer wall of the vehicle. This probe (PITOT tubes) is generally provided with front and side orifices for aerodynamically picking up pressures which be conveyed, for use, to sensors disposed inside the structure of the aircraft through pneumatic ducts of suitable length and section.

This arrangement presents well known disadvantages which are the following:

First of all, the great length of the pneumatic connecting ducts between the external probe and the internal sensors associated with the apparatus for using the pressure measurements causes a lack in response of the device all the longer and more troublesome since high speed acquisition and processing of the data relative to the pressure is required for piloting the aircraft and vehicles flying at speeds which may exceed mach 2.

Then the very existence of these pneumatic ducts affect the real reliability of the measurements, because of the environmental temperature variations related more especially to the electrothermic de-icing of the probe as well as the aerodynamic heating of the surface walls of the aircraft.

In addition, for maintenance purposes, the need to divide ducts of relatively large section (6 to 12 mm in diameter) into segments all along their path from the outer probe to the inside of the structure of the aircraft where the associated sensors and measuring apparatus are situated (generally in multiple copies so as to increase operating reliability), entails the provision of a certain number of connecting elements which increase the volume, the weight and the cost of the installation, besides increasing the usual risks of leaks and stoppages more especially by icing.

This is why, in order to overcome these disadvantages, it has already been proposed, more especially by French Pat. No. 1 598 497 to incorporate the pressure sensor or sensors inside the tubular probe outside the aircraft and to convey the information collected by electrical means to the internal user unit of the aircraft, and more precisely to provide a fluid pressure measuring device comprising an electronic circuit using the properties of a resonating cavity sensor whose resonance frequency is modified by the variations of electric capacity due to the mechanical deformation of a wall under the effect of the pressure to be measured, the device using a single coaxial cable for electrically connecting the sensor to the user circuit.

However, with the above mentioned device, when it is desired to make static pressure measurements, the defects due to the connecting cable disturb the measurements.

SUMMARY OF THE INVENTION

For this, the present invention provides a device of the above mentioned type in which the resonating cavity sensor is placed, via the coaxial cable, in the leg of an impedance bridge revealing the value of the standing wave rate (TOS) characteristic of the difference between the tuning frequency of the cavity and the frequency of an oscillator, and the user circuit comprises a servo-control permanently ensuring equality of the mean frequency of the oscillator and of the tuning frequency of the resonating cavity sensor.

With the invention and the stationary wave rate serving for controlling the oscillator, the pressure to be measured is not related to this stationary wave rate but to the frequency variation of the oscillator.

BRIEF DESCRIPTION OF THE DRAWINGS

The constructional and operating features of the invention will be better understood from reading the following description of one embodiment, given by way of non limitative example with reference to the accompanying drawings in which.

DESCRIPTION OF THE PREFERRED EMBODIMENT

Figure 1:
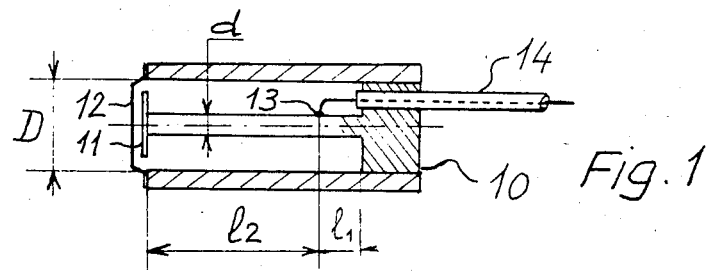
FIG. 1 shows, in axial section, the structure of a resonating cavity capacitive pressure sensor element and a section of its connecting coaxial cable.

A. Sensor part (FIG. 1)

According to the example given for a better understanding of the invention, sensor 10 is essentially an ultra-high frequency resonating cavity formed of a short circuit inductive coaxial line whose free end terminates in a capacitive element. This latter is formed by a small flat capacitor one of whose plates is formed by a plate 11 integral with the conducting core of the coaxial line and whose other plate is formed by a front wall deformable under the effect of the external pressure. This deformable wall which hermetically closes the cavity of the sensor is normally formed from a flexible resilient metal membrane 12.

As will be explained further on, in order to provide, with the associated electronic circuit, the coupling required for energizing sensor 10 as well as for measuring its tuning frequency as a function of the pressure exerted on membrane 12, an electric connection 13 is formed which, although normally situated by calculation in the vicinity of the foot of the core of the coaxial line, may be accurately and optimally positioned on this line by a suitable adjustment carried out during manufacture.

Naturally, when the device is intended for absolute pressure measurement, the hermetic cavity of the sensor is exhausted of air.

The operating principle of the sensor of the invention is based on the following theoretical and experimental considerations:

The resonance (or tuning) frequency y of the cavity is obtained by working out the sum of the admittances of the short circulated coaxial line and of the closed line on the variable capacity at the point of connection 13 of the electric energization and measurement tapping, namely:

$$y = \frac{\cos\frac{2\pi l1}{\lambda}}{jZ_c \sin\frac{2\pi l1}{\lambda}} + \frac{\frac{1}{Z}\sin\frac{2\pi l2}{\lambda} + jC\frac{2\pi c}{\lambda}\cos\frac{2\pi l2}{\lambda}}{\cos\frac{2\pi l2}{\lambda} - C\frac{2\pi c}{\lambda}Z\sin\frac{2\pi l2}{\lambda}}$$

with l1: length of the core of the coaxial line to the short circuit;
l2: length of the core of the coaxial line to the variable capacity;
$\lambda$: wave length at the frequency considered;
c: speed of light;
$Z_c$: characteristic impedance of the coaxial line and substantially equal to $\delta \log_{10} D/d$, where:

D: diameter of the internal wall of the coaxial line;
d: diameter of the core of the coaxial line;
$\delta$: permeability constant of the dielectric (equals 138 In air or in a vacuum)

and with

C: capacity formed by the membrane and the internal end plate of the coaxial line = $\epsilon(s/e)$ where $\epsilon$: constant of propagation in the dielectric (=$3 10^8$ m/s),
s: surface of the end plate,
e: distance between the plate and the membrane.

In fact, because of the curvature of the membrane, the capacity variation is equal to about one third of the variation calculated with this latter approximate formula. For a membrane of given stiffness K, whose deformation is a substantially linear function of the pressure P to be measured, the following relation is thus obtained between the tuning frequency of the resonating cavity and the pressure exerted on the membrane of the sensor:

$$\frac{KP}{\epsilon s Z_c} = \frac{2\pi c}{\lambda}\tan\frac{2\pi l2}{\lambda}$$

A limited development of the function (tan arc) indicates quadratic relationship between the tuning and displacement frequency of the membrane which provides satisfactory linearity in an extensive range of variation of the pressure to be measured.

Figure 2:
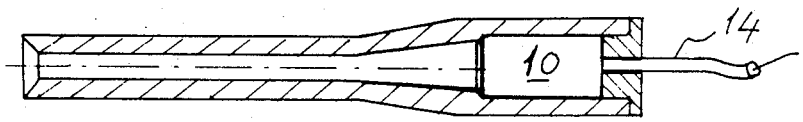
FIG. 2 shows, in axial section, a tubular aerodynamic pressure taking probe (Pitot) incorporating the sensor element of FIG. 1.

Technologically speaking, the sensor properly speaking is advantageously constituted by a cavity formed in a cylindrical body made from "INVAR" for limiting thermal expansion effects, the inside walls of this cavity being coated with silver for improving the electric surface conductability. The overall dimensions of the cylindrical body are about 12 mm in diameter and about 15 mm in height, which allows it to be readily incorporated in a Pitot tube (FIG. 2).

The flexible membrane which closes the cavity is made from a sheet of material with high elastic limits, such for example as that sold under the trademark "DURINVAL" or "NISPAN C".

In order to obtain great robustness and perfect sealing of the cavity, the membrane is welded with silver or by electronic bombardment to the body of the sensor and the electrical connection, with the electronic case of the user circuit described hereafter, is formed by a semi rigid coaxial cable of 2 mm in diameter and of unlimited length, whose characteristic impedance is 50 ohms.

Under the experimental conditions given above, the resonance frequency of the sensor constructed in accordance with the invention varies from 1.6 to 2.3 GHz for an absolute pressure range varying typically from 0 to 1500 mb.

Figure 5:
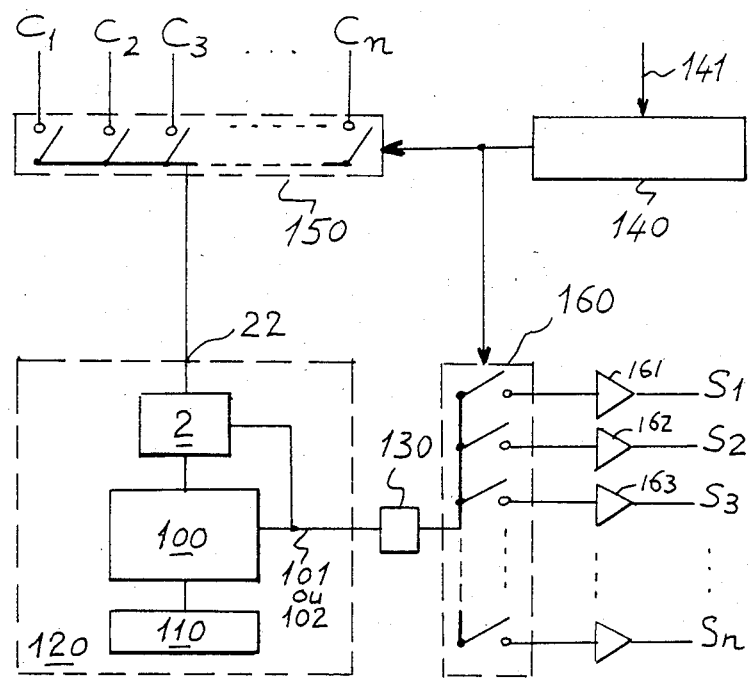
FIG. 5 shows schematically the functional organization of the device of FIG. 3 integrated in a multiplex system using a plurality of resonating cavity sensors.
Figure 3:
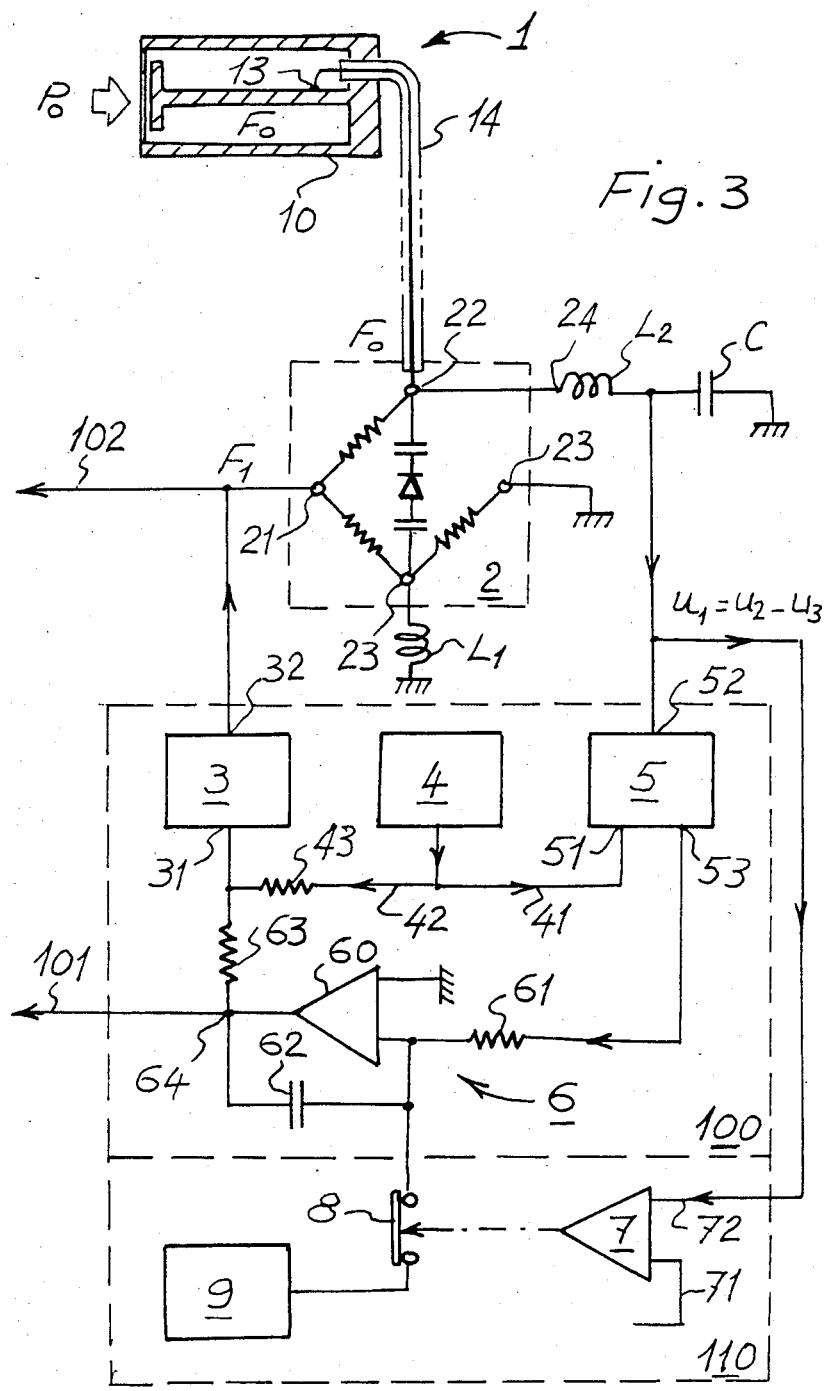
FIG. 3 shows schematically the functional organization of the whole of the pressure measuring device of the invention.
Figure 4:
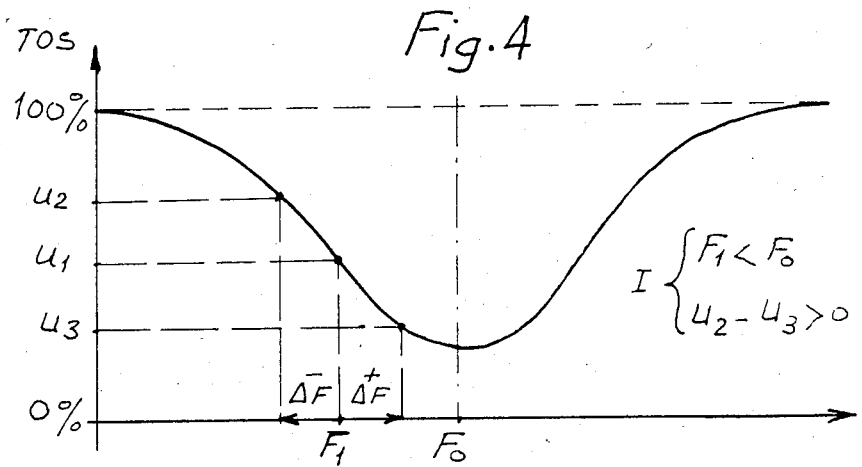
FIG. 4 shows graphically the voltage output data supplied by the TOS meter as a function of the tuning ($F_0$) and energization ($F_1$) frequencies of the resonating cavity belonging to the device of FIG. 3.
Figure 4:
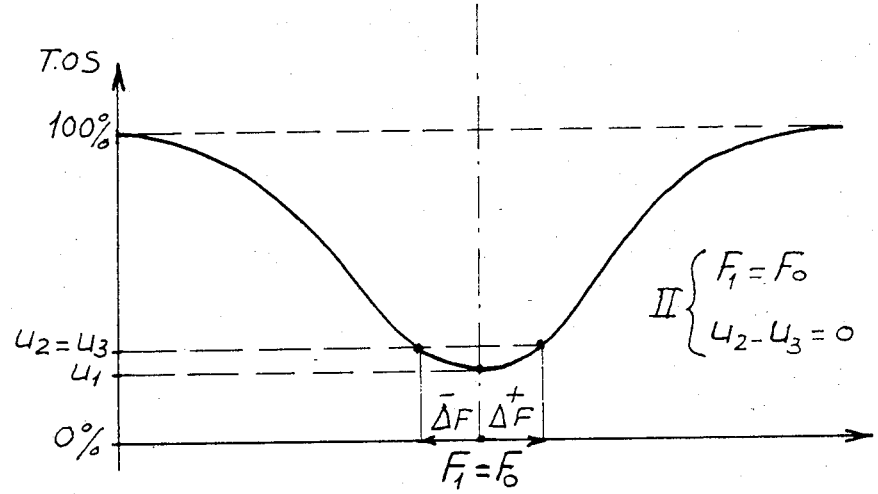
Figure 4:
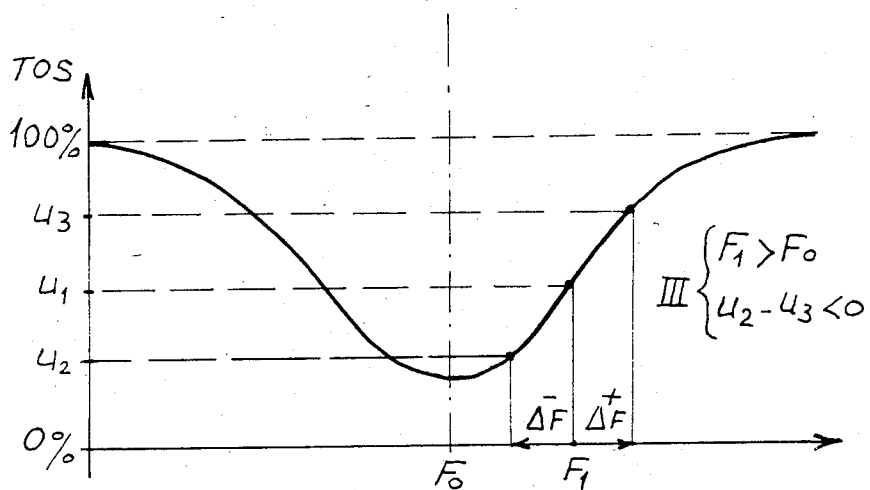

B. User circuit part (FIGS. 3, 4, 5)

The electronic user circuit is intended to supply an electric output signal which is representative of the pressure exerted on the associated sensor from the measurement of the natural frequency (or resonating frequency) of the cavity of this sensor.

The conventional methods for measuring the natural frequency of a very high frequency or ultra high frequency cavity consist:

either in using the cavity as a tuning circuit of an oscillator which will supply a frequency dependent on the natural frequency of the cavity and so on the pressure to be measured;

in measuring the power absorbed or transmitted by the cavity as a function of an energizing frequency supplied by an oscillator.

Now, considering the severity of the stresses of the device of the invention in use, entailing on the one hand a single connection between the sensor and its user circuit and, on the other hand, the need of separating the sensor and its user circuit by a very large distance, all these traditional methods prove to be insufficient in performance because of the technological limitations (stability of the temperature behavior and resistance) of the electronic components at present available.

The device of the invention results then from the design and perfecting of a new conception consisting in measuring the standing wave rate in the single line connecting the sensor to the user circuit. With the sole restriction of perfect impedance matching between the coaxial connection and the sensor on the one hand, and between the coaxial line and the impedance bridge showing the standing wave rate on the other, this method makes the measurement totally independent of the natural characteristics of the line, of the sensor, of the impedance bridge and particularly of their possible instabilities (drifts in time or in temperature) and also allows simple and stable multiplexing of a plurality of sensors utilizing a single user circuit sequentially.

Through the coaxial line, the sensor is then placed in a leg of an impedance bridge, this latter showing the variations of the standing wave rate (TOS) in the coaxial line.

FIG. 3 gives the diagram of the general organization of the device whose operation is as follows:

Assembly 1, formed by sensor 10 and its coaxial connection 14 with a TOS meter 2, is energized by an oscillator 3 whose frequency is controlled by a voltage applied to its input 31.

This generator 3 is permanently servo-controlled about the natural frequency of the sensor by means of a servo control circuit 100 comprising in a conventional way: a sweep oscillator 4, a synchronous demodulator 5, an integrator 6 and the voltage controlled frequency generator or oscillator 3.

Because of the small frequency deviation about the natural frequency effected by the servo-control circuit 100, this latter, although ensuring perfect tracking of the fluctuating or time variable pressures undergone by sensor 1, does not automatically lock onto the resonance frequency of sensor 1 when the device is switched on.

An initialization circuit 110 formed of the ramp generator 9 and comparator 7 controlling switch 8 is therefore used for obtaining this automatic lock on.

When the device is switched on, the permanent measuring operating conditions will then be reached in two successive operating modes, the sequential carrying out of which is automatic:

The second of these modes is a search mode (or initialization), where, in a first stage, circuit 10 seeks the approximative resonance frequency of the sensor by sweeping the frequency range corresponding to the whole of the measuring range. When an appreciable reduction in the TOS (standing wave rate) is detected, the sweep is stopped and the system goes automatically over to the tracking mode.

The second of these modes is a tracking mode, in which the frequency of the oscillator is modulated by a rectangular signal about the value determined by the initialization mode. This modulation forms a sweep for locking the oscillator onto a mean frequency equal to that of the resonance of the sensor, the measurement of this frequency giving the desired accuracy data.

This measurement is effected conventionally by means of a frequency meter directly measuring (or after frequency division) the mean output frequency of the oscillator 3. Since the modulating signal is periodic, it may be transmitted over a long distance without degradation due to parasite resistances or to the induction of parasite signals coming from adjacent electromagnetic or electric circuits.

Another measuring method provided consists in measuring the mean DC voltage for controlling the oscillator which, since it is itself proportional to the resonance frequency of the sensor, is therefore also proportional to the pressure to be measured.

A detailed description of the physical structure as well as the operation of the user circuit is given hereafter with reference to the diagram of FIG. 3.

For a given pressure Po to be measured, the sensor has a frequency Fo (for example from 1 to 3 GHz). The assembly 1 (comprising the resonating cavity sensor and its coaxial cable connection) is placed in the leg 22-23 of the impedance bridge 2, serving as TOS meter.

This latter is supplied at its input 21 with a frequency F1 very little different from Fo coming from the oscillator 3 of the servo control circuit 100. The DC voltage $U_1$ present at the output terminal 24 (after filtering by elements L1, L2 and Lc for removing the ultra high frequency and sweep frequency residues) is a function of the standing wave rate (TOS) existing in assembly 1, so of the difference between the energization frequency F1 and the natural frequency Fo of the sensor according to a law shown graphically in FIG. 4.

This voltage $U_1$ passes through a minimum when F1=Fo.

The voltage $U_1$, called error voltage, is used by the servo control circuit 100 so that it is permanently kept at a minimum, that is to say that the frequency F1 supplied by oscillator 3 is permanently equal to Fo whatever the fluctuations of the pressure to be measured (so of frequency Fo).

For this servo control, circuit 100 uses the idea of "feeling" the resonance mode of the cavity of the sensor by a frequency modulation $\pm \Delta f$ (typically 50 to 500 KHz) of a low deviation about the value F1. For that, the control voltage applied to the input 31 of oscillator 3 is the sum of the DC voltage present at point 64 representing F1 and the sweep voltage present at 42 supplied by the sweep oscillator 4 representing $\pm \Delta f$, (typically, the value of the sweep frequency is 10 to 100 KHz).

Resistors 43 and 63 effect the summation of these voltages applied to the control input 31 of the variable oscillator 3.

As shown graphically in FIG. 4, the DC voltage from the TOS meter 2, and present at terminal 24, oscillates therefore at the frequency of the sweep oscillator 4 between the values $U_2$ and $U_3$.

The value of $U_2-U_3$ which is cancelled out for F1=Fo, is positive or negative depending on the sign of F1-Fo.

The synchronous demodulator 5 effects the measurement of $U_2-U_3$, whose value is available at its output terminal 53. This voltage $U_2-U_3$ is applied to the input of the integrator 6 formed by the high gain amplifier 60, resistor 61 and capacitor 62.

The output voltage at 64 of this integrator 6 evolves until $U_2-U_3=0$, i.e. until F1=Fo, thus providing permanent servo control of the system and ensuring tracking of the pressures fluctuating in time.

The output information is available either in the form of a DC voltage (output 101), representing the voltage 64 equal to the mean voltage 31 for controlling the oscillator 3, or in the form of a frequency at output 102 representing the output frequency at 32 of the oscillator which frequency is permanently equal to the natural frequency of the cavity of the resonating assembly 1 (sensor 10 and coaxial cable 11).

However, on switching on the device, the frequency F1 of oscillator 3 may be very far removed from the natural frequency Fo of the cavity. In this case, the voltage $U_2-U_3$ may be too small to be effectively measurable and to ensure evolution of voltage 64 to its final value (i.e. to cause the convergence of frequency F1 towards frequency Fo).

To get over this problem, the user circuit 100 is completed by the initialization circuit 110, ensuring in all cases evolution of the state of the system towards its final value. With this end in view, the initialization circuit 110 comprises a comparator 7 comparing a threshold voltage 71 with the actual value $U_1$ supplied by TOS meter 2 and applied at 72.

As long as $U_1$ is high and greater than the threshold 71, the comparator 7 causes closure of switch 8 thus applying a voltage ramp supplied by the ramp generator 9 to the input of amplifier 60. This ramp is naturally of a sufficient amplitude to explore the whole frequency range of the sensor.

When the frequency F1 supplied by oscillator 3 controlled by the voltage of the ramp generator 9 is close to Fo, the voltage U1 delivered by the TOS meter is considerably reduced and when this voltage is less than the fixed threshold, comparator 7 controls the opening of switch 8. From this time, since voltage 64 is close to its final value, the servo control circuit 100 becomes operative and ensures final lock-on of F1 to the resonance value Fo of sensor 10.

Among the advantages already mentioned with respect to the prior art, the possibility of using a single user circuit with a plurality of sensors is a major advantage in aeronautics. This is why the particular arrangement of the means required for putting this operating possibility into practice is set forth hereafter with reference to FIG. 5.

Besides the user circuit 120 already described, formed by the impedance bridge (TOS meter) 2, the servo control circuit 100 and the initialization circuit 110, the assembly comprises:

- a matched impedance (50 ohms for example) switch 150 for successively switching a plurality of sensors designated by Cl to Cn to the input 22 of the TOS meter 2,
- a switch 160 of conventional construction for switching either the frequency output 102 through the frequency meter 130, or the voltage output 101 to the n output lines designated by Sl to Sn,
- and a sequencer 140, i.e. a generator either independent with fixed rate, or controlled by an external input 141 coming from the system which uses the data supplied by the sensors.

The function of this sequencer is to provide synchronous switching of the switches 150 and 160 for delivering respectively at a given time (periodically or on request):

the data from sensor Cl to output SI
the data from sensor Cn to the output Sn.

In the case where, for the application considered, the sequencer is independent, voltage maintenance circuits 161 and 162, etc . . . are provided for having permanently available output data from sensor Cl to Cn respectively at the outputs Sl to Sn.

By way of example, the frequency of a complete switching cycle is 100 to 1000 Hz, providing refreshment of the data available at the outputs Sl to Sn every one to ten milliseconds.

What is claimed is:

1. A pressure measuring device, comprising:
   at least one sensor having a resonating cavity, said cavity comprising a deformable wall means, whereby deformation of said wall means, responsive to a pressure to be measured, results in a variation of a capacity of said resonating cavity and a resonance frequency thereof,
   an electronic user circuit comprising an impedance bridge,
   a coaxial cable for connecting said sensor to said user circuit, said coaxial cable connecting said sensor in a leg of said bridge,
   an oscillator connected to said bridge and having a frequency different from said resonance frequency of said sensor to result in a standing wave rate in said coaxial cable in accordance with a frequency difference between said frequency of said oscillator and said resonance frequency, and
   a servo control for controlling said oscillator to cause a mean frequency of the oscillator to be equal to said resonance frequency of said sensor.

2. The pressure measuring device as claimed in claim 1, wherein the servo control has two successive operating modes comprising a search mode and a tracking mode whose selection is automatic.

3. The pressure measuring device as claimed in claim 2, further comprising a plurality of said sensors and a switch for mutliplexing said plurality of sensors with a single said user circuit.

4. The pressure measuring device as claimed in claim 1, wherein said at least one resonating cavity sensor is incorporated in one of a static and a total-fluid pressure measurement probe.

5. The pressure measuring device as claimed in claim 4, further comprising a plurality of said sensors and a switch for multiplexing said plurality of sensors with a single said user circuit.

6. The pressure measuring device as claimed in claim 1, further comprising a plurality of said sensors and a switch for multiplexing said plurality of sensors with a single said user circuit.

* * * * *